United States Patent [19]

Buget

[11] 4,368,958

[45] Jan. 18, 1983

[54] ARRANGEMENT FOR DETERMINING THE POINTS OF PENETRATION OF EYEGLASS AREAS BY VISUAL AXES

[76] Inventor: Bernard J. P. Buget, 93, rue Nationale, Forbach, France

[21] Appl. No.: 162,744

[22] Filed: Jun. 25, 1980

[30] Foreign Application Priority Data

Apr. 23, 1979 [FR] France .................................. 79 10729
Apr. 23, 1980 [DE] Fed. Rep. of Germany ....... 3015488

[51] Int. Cl.³ .......................... A61B 3/10; A61B 3/02; A61B 3/10
[52] U.S. Cl. .................................... 351/204; 351/233; 33/200
[58] Field of Search ..................... 351/5, 8, 26; 33/200

[56] References Cited

U.S. PATENT DOCUMENTS 4,190,331  2/1980  Padula et al. .

Primary Examiner—John K. Corbin
Assistant Examiner—Rodney B. Bovernick
Attorney, Agent, or Firm—Young & Thompson

[57] ABSTRACT

An arrangement for determining the location relative to eyeglass frames of points at which visual axes penetrate through eyeglass areas of eyeglasses includes a sighting object having two concentric target zones one of which emits polarized light. A support is removably attached to an eyeglass frame and at least one polarized filter having a polarization plane extending transversely of that of the light issuing from the one target zone is mounted on the support for movement in parallelism with the respective eyeglass area toward a position of registry with the respective visual axis, in which position the polarized filter at least substantially obscures the one target zone. Another, larger, polarization filter is removably mounted on the support and obscures the one target zone for the eye which is not then being examined. The location of the points of penetration of the visual axis of the eye being examined is achieved by moving the first-mentioned polarization filter up and down and transversely of the respective eyeglass area until the proper position is found and recorded for use in subsequent production of the respective eyeglass or corrective lens.

16 Claims, 3 Drawing Figures

ARRANGEMENT FOR DETERMINING THE POINTS OF PENETRATION OF EYEGLASS AREAS BY VISUAL AXES

BACKGROUND OF THE INVENTION

The present invention relates to an arrangement for determining the location relative to eyeglass frames of points at which visual axes penetrate through eyeglass areas of eyeglasses.

It is a current practice to select the size of eyeglass frames, after the customer has chosen the style, in accordance with the head measurements of the particular customer, such as the head width or temple-to-temple distance, and/or the shape and size of the nose of the customer. While the distance between the eyes of the respective customer may be taken into consideration by the optician when recommending, or by the customer when choosing, the style of the eyeglass frame, it plays no role, or only a subordinate one, in selecting the size of the eyglass frame for the particular customer. Hence, the positions of the eyes relative to the eyeglass areas (that is the areas which are eventually occupied by the corrective lenses) usually vary from customer to customer, and so do the points of penetration of the optical axes through these eyeglass areas. In addition thereto, the positions of the eyes and thus the locations of the points of penetration of the optical axes of the eyes with the eyeglass areas depend on the distance between the object being observed and the user of the eyeglasses.

It is very desirable that the optical axes of the corrective lenses coincide with the visual axes of the eyes. In order to be able to achieve this, it is necessary to ascertain the locations at which the visual axes of the two eyes penetrate through the eyeglass areas of the eyeglass frame. As explained above, these locations are different for reading glasses and for distant vision glasses.

OBJECTS AND SUMMARY OF THE INVENTION

Accordingly, it is a general object of the present invention to provide an arrangement for determining the location relative to eyeglass frames of points at which visual axes penetrate through eyeglass areas of eyeglasses.

More particularly, it is an object of the present invention to so construct the arrangement of the type here under consideration as to be able to obtain highly accurate indications therefrom.

A further object of the present invention is to so design this arrangement as to be simple in construction, easy to use, and reliable nevertheless.

In pursuance of these objects and others which will become apparent hereafter, one feature of the present invention resides in the provision of an arrangement for determining the location relative to eyeglass frames of points at which visual axes penetrate through eyeglass areas of eyeglasses, which arrangement, briefly stated, comprises a sighting object having two concentric target zones each of which is visually distinguished from the adjacent regions of the object; a support; means for removably attaching the support to the respective eyeglass frame; and means for locating the points, including at least one locating member (but preferably two locating members, one for each of the eyes) and means for mounting the locating member (or each locating member) on the support for movement in substantial parallelism with the respective eyeglass area toward a position of registry with the respective visual axis, in which position the locating member at least considerably obscures one of the target zones. Advantageously, the arrangement also includes shielding means, such shielding means including at least one shielding member (but preferably two shielding members, one for each of the eyes) having a size exceeding that of the locating member, and means for positioning the shielding member across the visual axis of that eye which is not then being examined to obscure the one target zone for this eye. It is further advantageous when the shielding member (or each shielding member) is removably attached to the support. Preferably, each of the locating and shielding members is a filter.

When the arrangement for determining the location relative to eyeglass frames of points at which visual axes penetrate through eyeglass areas of eyeglasses is constructed in the above-discussed manner, it has the special advantage that the eyes are safely and exactly concentrated on the sighting object.

As the position of the visual axis of one of the eyes is being determined, the locating member is moved in front of this eye upwardly and downwardly as well as in the two transverse directions parallel to the eyeglass area, while the shielding member is absent from the range of vision of the eye which is being examined, until that point (and, consequently, the location of the penetration point sought after) is found at which the aforementioned one target zone is concealed from view to the eye being examined and, consequently, until this one target zone is changed or, preferably, fully obscured. At the same time, the eye being examined remains securely fixed upon this one target zone, despite its partial or complete disappearance for this eye, inasmuch as the other target zone is still visible to this eye. Inasmuch as this other target zone was always seen in conjunction with the one target zone and, due to the concentric arrangement of these two target zones, in effect, at the same location, the mere fact that the one target zone is obscured for the eye being examined will not cause this eye to shift, particularly in view of the fact that the other target zone is still readily perceived by this eye. The fixation of the eye being examined upon this location is further considerably enhanced by the fact that the other eye, in front of which the shielding member is situated at this time, also perceives the other target zone, so that both eyes concentrate on this other target zone. The fixation of both eyes on the other target zone is undistracted or less distracted exactly at the time when the aforementioned one target zone becomes darker, disappears altogether or, in any event, changes its appearance for the eye the position of the visual axis of which is then being determined, due to the obscuring action of the locating member cooperating with this eye. In this respect, it is to be mentioned that the change in perception by one of the eyes is, to a certain extent, compensated for by the equalization of the image of the two eyes. Usually, the shielding member consists of the same material as the locating member, so that it has the same effect as the latter.

Preferably, the sighting object includes a source of polarized light constituting the one target zone; then, each of the filters which constitute the locating and shielding members is a polarized filter which is so positioned that the polarization plane thereof extends substantially at right angles to that of the light emanating from the one target area. As a result of this cooperation of the polarized filters with the polarized light, the one target zone is fully or almost fully extinguished for the respective eye, either by the filter constituting the shielding member, or by the filter constituting the locating member, when this filter is located across the respective visual axis aiming at the two target zones.

However, it is also possible to utilize, in the above-discussed sense, a variety of other visual effects. So, for instance, one could operate with colors, for instance, the filter constituting the locating member could change the color of the one target area (such as, for instance, by having a color complementary to that of the one target area), so that, for instance, the color of the one target area will be at least substantially the same as that of the region adjacent to the one target area, as a result of which the one target area is extinguished or disappears for the eye being examined when the filter constituting the locating member extends across the visual axis aiming at the one target area. However, it is also possible and contemplated by the present invention to utilize glass plates or other elements which are provisionally mounted on the eyeglass frame, such as light-sensitive members of glass which responds to the action of light rays outside the range of visible light wavelengths, which provisional members amplify the changes brought about by the locating members, or modify these changes once again, or even cause these changes to appear as visible light.

In accordance with an advantageous and currently preferred embodiment of the present invention, the support includes a transverse guide extending adjacently to the eyeglass areas, and the mounting means for the respective locating members includes a slide guided on the guide for displacement longitudinally thereof, and a mounting member, preferably an elongated rod, which is mounted on the slide for movement transversely of the guide and along the respective eyeglass area, the locating member being affixed to this mounting member. When the support and the mounting means are constructed in this manner, it is very easy to equip the arrangement with means for indicating the position of the locating member relative to the support or to the eyeglass frame, inasmuch as such indicating means may be formed as a first scale on the guide and a second scale on the mounting member. However, it is also conceivable and contemplated by the present invention to employ other measuring or indicating devices. Furthermore, it would also be possible to simply mark the determined points of penetration of the visual axis through the eyeglass areas on transparent plates or the like which are provisionally mounted on the eyeglass frame.

In accordance with a further advantageous aspect of the present invention, the arrangement is further equipped with an indicating element associated with the respective locating member and extending from the mounting member at the elevation of the locating member in substantial parallelism with the guide toward the outer part of the periphery of the respective eyeglass area, this indicating element bearing a third scale which indicates the distance of the locating member from the aforementioned outer periphery part.

It is very advantageous when, in accordance with a further facet of the present invention, the respective shielding member is mounted on the support for pivoting into and out of the position in which the shielding member extends across the respective visual axis. However, it is also possible to use only a single shielding member which is fully removable from the arrangement and is positioned in front of one of the eyes, in one instance, and in front of the other eye, in the other instance.

In a further advantageous modification of the arrangement of the present invention, the sighting object includes a plate-shaped support member having an aperture, the support member being preferably of a dark color at least at regions surrounding the aperture and the aperture being preferably adjustable as to its size, and a light source, preferably an adjustable intensity light source, arranged behind this aperture and constituting therewith said one target zone. Then, the other of the target zones may be advantageously constituted by a light-color formation, especially a ring-shaped formation, located within the dark-color region of the plate-shaped support member and extending around the aperture.

However, a variety of alternative solutions can also be used here. So, for instance, the one target area could be constituted by a beam of polarized light reflected from a reflector and emanating from a different source, the beam of light being either formed directly at the light source or confined to its cross section only at the reflector. The other target area could also be constituted by direct or reflected light.

It is further advantageous when the polarized light source is adjustable so as to be able to change the polarization plane of the light emanating from the one target area. This adjustability can be achieved, for instance, by utilizing a polarizing plate mounted on the plate-shaped support member for turning about its axis. In this manner, it is possible to properly select the polarization plane of the light emanating from the one target area even if the head of the examinee assumes an inclined position.

The locating member preferably has a simple outline, preferably a square outline, and a size of 10 to 150 mm$^2$, preferably of 40 to 100 mm$^2$.

Other features which are considered as characteristic of the invention are set forth in particular in the appended claims. The improved arrangement itself, however, both as to its construction and method of using the same, together with additional features and advantages thereof, will be best understood upon perusal of the following detailed description of certain specific embodiments with reference to the accompanying drawing.

DETAILED DESCRIPTION OF THE PREFERRED EMBODIMENTS

Figure 1:
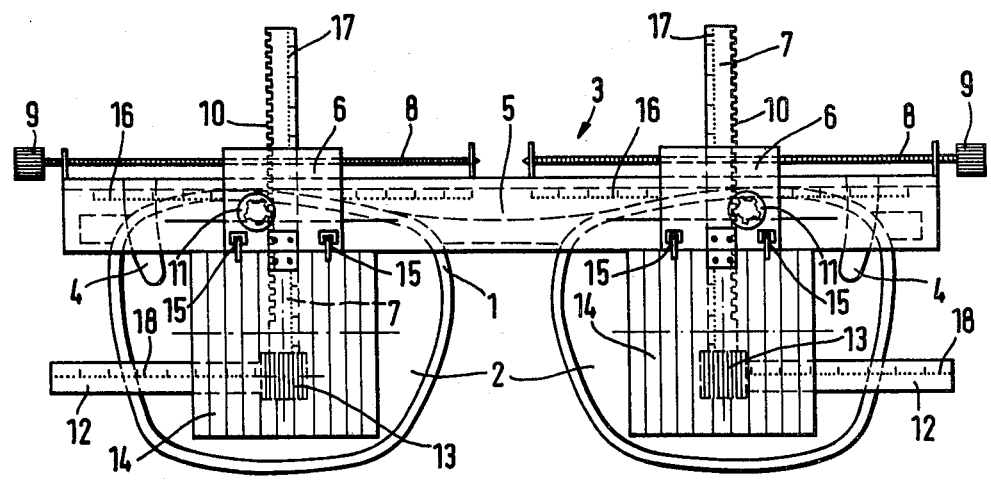
FIG. 1 is a front elevational view of one part of the arrangement of the present invention as attached to an eyeglass frame.

Referring now to the drawing in detail, and first to FIG. 1 thereof, it may be seen that the numeral 1 has been used to indicate an eyeglass frame including two eyeglass mounting portions 2 surrounding the respective eyeglass areas which, in the finished eyeglasses, will be occupied by the respective corrective lenses. A support 3 is is removably attached to the eyeglass frame 1 by means of two hooks 4 which clampingly engage the eyeglass frame 1 at the respective mounting portions 2. The support includes a transverse beam or guide 5 which adjoins the eyeglass frame 1 and is located in front thereof. Thus, the two hooks or clamps 4 extend from the transverse guide 5 above the eyeglass frame 1 and engage the same from behind.

Two slides 6 are mounted on the transverse guide 5 for movement longitudinally thereof. Each of the slides 6 can be moved in the longitudinal direction of the transverse guide 5 by means of a discrete spindle 8 which is provided with an enlarged engaging portion 9 in the form of a turnable knob. A separate elongated rod or bar 7 is mounted on each of the slides 6 for displacement in a direction substantially normal to the longitudinal direction of the guide 5 and in parallelism with the respective eyeglass area, that is, upwardly and downwardly as seen in FIG. 1. Each of the bars 7 is provided with a toothed portion 10 which meshes with a pinion rotatably mounted on the slide 6 and connected for joint rotation to a turnable knob 11 by means of which the respective pinion can be rotated and, consequently, the rod 7 can be displaced upwardly or downwardly relative to the slide 6, depending on the direction of rotation of the turnable knob 11. A further rod 12 is affixed to the lower end of the respective rod 7 and extends at a right angle to the rod 7 toward the outer part of the periphery of the respective mounting portion 2 of the eyeglass frame 1. Except for the spindle 8, the above-described components of the arrangement of the present invention preferably consist of a transparent synthetic plastic material, such as Plexiglas. A polarizing filter 13 having dimensions of, for instance, 8 mm by 8 mm, is mounted at the lower end of the respective bar 7. Another polarizing filter 14 having dimensions considerably exceeding those of the polarizing filter 13 but having the same polarization plane is situated in front of each of the polarization filters 13 and is mounted on the slide 6 by means of a hinge 15, so that it can be pivoted upwardly and out of the vision field of the examinee.

The lateral position as well as the elevation of the small-size polarization filter 13 relative to the transverse guide 5 and, consequently, relative to the eyeglass frame 1, can be ascertained on a respective first scale 16 provided on the transverse guide 5, on a respective second scale 17 provided on each of the rods 7, and on a third scale 18 provided on each of the further rods 12. Herein, the distance of the two polarization filters 13 from one another can be ascertained on the scale 16, the spacing of the polarization filters 13 from the upper edge of the respective mounting portion 2 of the eyeglass frame can be ascertained on the respective scale 17, and the distance of the respective polarization filter 13 from the outer or lateral part of the periphery of the mounting portion 2 of the eyeglass frame 1 can be ascertained on the respective scale 18.

Figure 2:
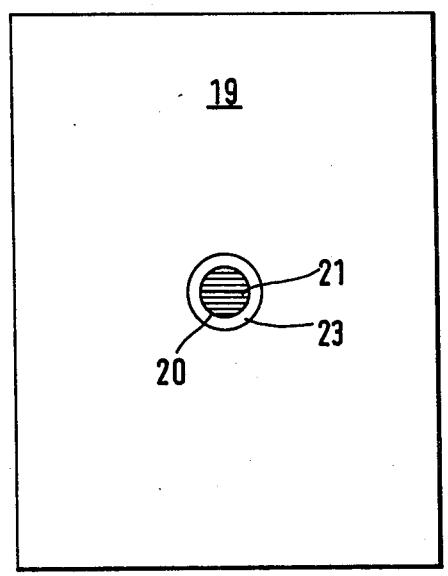
FIG. 2 is a front elevational view of a sighting object which forms another part of the arrangement of the present invention.
Figure 3:
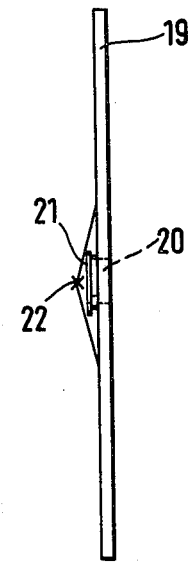
FIG. 3 is a view from the left of FIG. 2.

A further part of the arrangement according to the present invention is constituted by a sighting object which is illustrated in FIGS. 2 and 3 in the form of a plate 19. The plate 19 is preferably of a dark color at least at that surface which faces the examinee, and is provided, at its center, with a diaphragm opening or aperture 20. The aperture 20 is illustrated, in order not to unduly encumber the drawing, in a simplified manner as an aperture of fixed cross section. However, in accordance with the present invention, the size of the aperture 20 should be adjustable. In order to adjust the size of the aperture, one can resort to conventional aperture-size adjusting means. In the simplest case, such adjusting means may be constructed as a plate rotatably supported on the plate 19 and having openings of different sizes a selected one of which can be brought into registry with the aperture 20 provided in the plate 19. However, more sophisticated mechanisms of conventional constructions could be used instead.

A polarization filter 21 is arranged behind the aperture 20, the filter 21 being mounted on the plate 19. The polarization plane of the polarization filter 21 extends, assuming that the plate 19 is so arranged that its larger dimension extends vertically, in a horizontal direction. Thus, the polariation plane of the polarization filter 21 extends at right angles to the polarization planes of the polarization filters 13 and 14. In order to have a possibility of correction in this respect, the polarization filter 21 is so mounted on the plate 19 as to be turnable at least to a limited extent. A light source 22 is mounted on the plate 19 rearwardly of the aperture 20. The light source 22 is preferably adjustable as to the intensity of light emitted thereby. Finally, an annular formation 23, preferably of light color, is formed, preferably painted, on the exposed surface of the plate 19 which faces the examinee around the aperture 20.

Having so described the construction of the arrangement of the present invention, the operation thereof will now be briefly discussed.

The aperture 20 of the plate 19 (which may have the dimensions of 210×297×2 mm) is adjusted, when the plate 19 is arranged at a distance of 5 m from the examinee, to a diameter of 15 mm when the optical acuity of the eye being examined is 1/10, and to a 3 mm diameter for optical acuity of 10/10. On the other hand, when the plate 19 is arranged at a distance of 35 cm from the eyes of the examinee, the diameter of the aperture 20 is adjusted to 3 mm regardless of the optical acuity of the eye being examined. The magnitude of the annular formation 23 can also be selected in accordance with the optical acuity of the eye being examined.

The support 3 is attached to the respective eyeglass frame 1 by means of the clamps 4. Two provisional eyeglasses consisting of planar glass or other transparent material, such as synthetic plastic material, are mounted on the mounting portions 2 of the eyeglass frame 1, these provisional eyeglasses not having any corrective properties. It is advantageous to equip the eyeglass frame 1 with these provisional eyeglasses inasmuch as the points of intersection of the visual axes with the respective eyeglass areas surrounded by the mounting portions 2 of the eyeglass frame 1 for the respective convergence point can be easily marked on these provisional eyeglasses. Thereafter, the position of the polarization filter 21 is adjusted in such a manner that its polarization plane extends exactly at right angles to the polarization planes of the polarization filters 13 and 14, which latter positions correspond to the angle of inclination of the head of the particular examinee. To adjust the position of the polarization filter 21 in this sense, it is sufficient to rotate the polarization filter 21, while both of the polarization filters 14 are pivoted downwardly so that they extend across the field of vision of each of the eyes of the examinee, the turning of the polarization filter 21 being terminated when the examinee indicates that he or she is no longer able to see the light emanating from the light source 22.

When the points of penetration of the distant-vision visual axis through the eyeglass areas of the eyeglass frame 1 are to be determined, the plate 19 is situated, as already mentioned before, for instance, at a distance of 5 m from the person wearing the eyeglass frame 1 and approximately at the elevation of the eyes of such a person, and the size of the aperture 20 is selected in accordance with the optical acuity of this person. Then, one of the eyes is covered by the larger-size polarization filter 14 so that this eye is no longer able to perceive the light emanating from the light source 22, but that the annular formation 23 is still seen by this eye. Thereafter, the intensity of light emanating from the light source 22 is so adjusted that the light emanating from this source 22 is perceived by the other eye of the person being examined, with the polarization filter 14 associated with this eye assuming its upwardly pivoted position in which it is situated out of the field of vision of this eye, or at least substantially so.

Thereafter, the smaller-size polarization filter 13 is displaced, by means of the spindle 8, in the direction from the nose to the respective temple of the examinee or in the opposite direction, until the target zone constituted by the light emanating from the source 22 is no longer perceived by the eye being examined. Then, the position momentarily assumed by the polarization filter 13 is read on the scale 16. After this first measurement, the polarization filter 13 is displaced in the same direction as before, until the light emanating from the light source 22 is again perceived by the eye being examined, and the corresponding position of the polarization filter is again read on the scale 16. The average value obtained from these two measurements constitutes the exact monocular distance of the pupil of the eye being examined from the center of the eyeglass frame 1, and this position can also be marked on the provisional eyeglass. This, of course, assumes that the vertical location of the polarization filter 13 is such that the polarization filter 13 extends across the respective visual axis at least in one position of the polariation filter 13. Should this not be so, the position of the bar 7 is changed, until the proper elevation of the polarization filter 13 is found. This proper vertical position can be read on the scale 17 and/or marked on the provisional eyeglass. The provision of the scale 18 on the further rod 12 renders it possible to take an additional measurement of the distance between the polarization filter 13 and the inner or outer edge of the outer portion of the respective mounting portion 2 of the eyeglass frame 1, which outer portion is situated at the respective temple. At the time that the light emitted by the light source 22 disappears for the eye being examined, this eye continues to fix on the center of the annular formation or ring 23.

After the examination of the one eye is concluded, the measurement is performed for the other eye. To be able to do this, the polarization filter 14 associated with this other eye is pivoted upwardly and out of the field of vision of this eye, while the polarization filter 14 associated with the eye whose examination has been concluded is pivoted downwardly. Thereafter, the same manipulations as those discussed above are performed with the other polarization filter 13. Because of the functions which the polarization filters 13 and 14 perform, the polarization filters 13 may be referred to as locating filters, and the polarization filters 14 as shielding filters.

In order to measure the monocular pupil distance for determining the respective point of penetration for near vision, the plate 19, as already mentioned, is positioned in front of and at a distance of, for instance, 35 cm from the person wearing the eyeglass frame 1 and the size of the aperture 20 is reduced to 3 mm. Then, the examinee looks at the polarized light source 22, and one of the larger-size polarization filters 14 is pivoted downwardly in front of the respective eye, so that this eye is prevented from perceiving the light emanating from the light source 22, but still sees the annular formation 23 and observes the same. Thereafter, the small-size polarization filter 13 is shifted in front of the other eye which is then being examined in the same manner as described above in connection with the measurement of the location of the point of penetration for distant vision.

It is once more to be pointed out that, during all of these measurements, when the light emanating from the light source 22 disappears for the respective eye, the eyes of the examinee still retain their convergence and their accomodation to and aim at the center point of the annular formation 23.

To achieve this effect, it would be sufficient if the formation 23 were constituted by several dots distributed around the aperture 20. This possibility is also contemplated by the present invention. A further possibility is that the other target zone would be constituted by a source of non-polarized direct or reflected light in the center, while the one target zone which emits the polarized light would be arranged about the same and concentrically therewith.

The use of the arrangement of the present invention is particularly advantageous when eyeglasses are to be fitted which require exact centering, such as bifocal eyeglasses, progressive eyeglasses, glasses which are prescribed after the performance of a cataract operation, and eyeglasses having a very high number of diopters. The arrangement of the present invention can also be used for optometrical measurements for other purposes, for instance, such as those performed by an optometrist or ophthalmologist with the aid of a testing frame or for the complete checking of the visual field of a patient using various convergence points, or also for other medical purposes.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

With some modifications the arrangement can be used independently an eyeglass frame, i.e. in connection with another optical instrument for determining the location of the eyes, more specifically of the pupils, relative one to another and/or relative to the middle axis (root of the nose), in the horizontal and/or vertical coordinates. In the case of horizontal measurement only the locating member should have a larger vertical than horizontal dimension.

I claim:

1. An arrangement for determining the location relative to eyeglass frames of points at which visual axes penetrate through the two eyeglass areas of eyeglasses, comprising a sighting object having two concentric target zones each of which is visually distinguished from the adjacent regions of said object; a support; means for removably attaching said support to the eyeglass frame; means for locating said points, including a locating member for each of the eyeglass areas and means for mounting said locating members on said support for movement in substantial parallelism with the respective eyeglass areas toward a position of registry with the respective visual axis in which the thus moved locating member at least considerably obscures one of said target zones; shielding means including a shielding member for each of said locating members and each having a size exceeding that of the respective locating member; and means for positioning said shielding members across the visual axes of those eyes which are not being examined to obscure the one target zone for the non-examined dye, wherein each of said locating and shielding members is a polarized filter, and said sighting object includes a source of polarized light constituting said one target zone, and each of said polarized filters is so positioned that the polarization plane thereof extends substantially at right angles to that of the polarized light emanating from said one target zone.

2. The arrangement as defined in claim 1, further comprising means for so adjusting said polarized light source as to change the polarization plane of the light emanating from said one target zone.

3. The arrangement as defined in claim 1, wherein each of said locating members has a simple outline and an area of between 10 and 150 mm$^2$.

4. The arrangement as defined in claim 3, wherein said outline is a substantially square outline.

5. The arrangement as defined in claim 3, wherein said area is between 40 and 100 mm$^2$.

6. The arrangement as defined in claim 1, wherein said support includes a transverse guide extending adjacent to said eyeglass areas and said mounting means includes a slide guided on said guide for displacement longitudinally thereof, and a mounting member mounted on each slide for movement transversely on the respective guide and along the respective eyeglass area and having said locating member affixed thereto.

7. The arrangement as defined in claim 6, further comprising means for indicating the position of each locating member relative to said support, including a first scale on said guide and a second scale on said mounting member.

8. The arrangement as defined in claim 7, further comprising an indicating element extending from each mounting member at the elevation of the respective locating member in substantial parallelism with said guide toward the outer part of the periphery of the respective eyeglass area and bearing a third scale indicating the distance of the respective locating member from the corresponding outer part.

9. The arrangement as defined in claim 1, further comprising means for mounting each shielding member on said support for pivotal movement into and out of that position in which the shielding member extends across the corresponding visual axis.

10. The arrangement as defined in claim 1, wherein said sighting object includes a plate-shaped support member having an aperture, and a light source arranged behind said aperture, said aperture and said light source constituting said one target zone.

11. The arrangement as defined in claim 10, wherein said support is of a dark color, at least in the region surrounding said aperture, and wherein the other of said target zones is constituted by a light-color formation located within said dark-color region and extending around said aperture.

12. The arrangement as defined in claim 11, wherein said light-color formation is ring-shaped.

13. The arrangement as defined in claim 10, wherein said light source is an adjustable intensity light source.

14. The arrangement as defined in claim 10, wherein said aperture has an adjustable size.

15. The arrangement as defined in claim 10, wherein said aperture is provided with a polarized filter.

16. An arrangement for determining the distance between the pupils, comprising a sighting object having two concentric target zones each of which is visually distinguished from the adjacent regions of said object; a support; means for locating the points at which the visual axes penetrate the area of the support, including a locating member for each eye of the examinee and means for mounting said locating members on said support for horizontal movement toward positions of registry with the respective visual axes in which each locating member at least considerably obscures one of said target zones; shielding means including a shielding member for each of said locating members and each having a size exceeding that of the respective locating member; and means for positioning said shielding members across the visual axes of those eyes which are not being examined to obscure the one target zone for the non-examined eye, wherein each of said locating and shielding members is a polarized filter and said sighting object includes a source of polarized light constituting said one target zone and each of said filters is so positioned that the polarization plane thereof extends substantially at right angles to that of the polarized light emanating from said one target zone.

* * * * *